United States Patent
Oldani (10) Patent No.: US 9,623,611 B2
(45) Date of Patent: Apr. 18, 2017

(54) FLEXIBLE FIBER PLACEMENT SYSTEM FOR SMALL COMPOSITE PARTS MANUFACTURING AND METHODS

(71) Applicant: Tino Oldani, Rockford, IL (US)

(72) Inventor: Tino Oldani, Rockford, IL (US)

(73) Assignee: Ingersoll Machine Tools, Inc., Rockford, IL (US)

(*) Notice: Subject to any disclaimer, the term of this patent is extended or adjusted under 35 U.S.C. 154(b) by 0 days.

(21) Appl. No.: 14/662,461

(22) Filed: Mar. 19, 2015

(65) Prior Publication Data

US 2015/0266284 A1    Sep. 24, 2015

Related U.S. Application Data

(60) Provisional application No. 61/968,511, filed on Mar. 21, 2014.

(51) Int. Cl.
| | |
|---|---|
| *B32B 38/18* | (2006.01) |
| *B29C 70/38* | (2006.01) |
| *B29C 33/30* | (2006.01) |
| *B29C 33/34* | (2006.01) |

(52) U.S. Cl.
CPC ............ *B29C 70/38* (2013.01); *B29C 33/306* (2013.01); *B29C 33/34* (2013.01)

(58) Field of Classification Search
CPC ..... B29C 70/382; B29C 70/32; B29C 70/386; B29C 70/38; B29C 33/306; B29C 33/34
See application file for complete search history.

(56) References Cited

U.S. PATENT DOCUMENTS

| | | | |
|---|---|---|---|
| 6,096,164 A | 8/2000 | Benson et al. | |
| 7,407,556 B2 | 8/2008 | Oldani et al. | |
| 8,758,538 B2 | 6/2014 | Borgmann et al. | |
| 2007/0044919 A1 | 3/2007 | Hoffmann | |
| 2010/0252182 A1 | 10/2010 | Rettig | |
| 2011/0277935 A1* | 11/2011 | Borgmann | B29C 70/38 156/350 |

* cited by examiner

*Primary Examiner* — Jacob T Minskey
*Assistant Examiner* — Vishal I Patel
(74) *Attorney, Agent, or Firm* — Reinhart Boerner Van Deuren P.C.

(57) ABSTRACT

A fiber placement system for manufacturing components from composite materials is provided. The system includes a head system mounted to a pedestal and rotatable about a center longitudinal axis of the head system. The system also includes a robot in proximity to the head system, as well as a magazine for carrying a plurality of mold assemblies. The magazine is operable to index each mold assembly to a first location where it is retrievable by the robot, and a second location where it is outside of a working envelope of the robot.

20 Claims, 6 Drawing Sheets

FLEXIBLE FIBER PLACEMENT SYSTEM FOR SMALL COMPOSITE PARTS MANUFACTURING AND METHODS

CROSS-REFERENCE TO RELATED PATENT APPLICATIONS

This patent application claims the benefit of U.S. Provisional Patent Application No. 61/968,511, filed Mar. 21, 2014, the entire teachings and disclosure of which are incorporated herein by reference thereto.

FIELD OF THE INVENTION

This invention generally relates to fiber placement machinery, and more particularly to apparatuses and methods for manufacturing small sized composite parts.

BACKGROUND OF THE INVENTION

Automated fiber placement machines are nowadays widely used to manufacture parts, components and structures from composite materials. These systems typically comprise a fiber placement head spatially positionable by large envelope multiaxis positioners. The fiber placement head is operable to lay up carbon fiber composites and/or tape onto a stationary mold, i.e. tool.

The materials used in automated fiber placement heads are typically composed of unidirectional carbon fibers pre-impregnated into a resin and are provided as tapes, or thin strips, commonly known as "tows." The term "tows" is used herein to collectively refer to tows, tapes, or plys thereof.

Each head is usually capable to lay and compact a plurality of tows arranged side-by-side to form a "ply" or "course" over and onto a tool. The head usually has all means to lay-up the tows/tape automatically such as a compaction roller, means to individually cut or add each tow whenever required as well as means to heat up the tows/tape and/or the substrate zone to ensure sufficient tack for tow/tape adhesion.

The head is also automatically fed by an integrated tow magazine (creel) which supplies the tow/tape in an organized array and with a correct tension. This tow/tape magazine system and fiber placement head are mounted at the ram end of the multiaxis positioner which under instructions provided by suitable control means is capable of following a desired multiple-pass lay-up path onto a stationary mold which remains stationary and is anchored to the ground. Because most of the tools upon which the tows/tape are laid upon have a double curvature contour or other complex geometry, the multiaxis positioners have at least five axes in order to properly position and maintain the compaction roller normal to the surface and/or tangent to the forming skin on the tool.

In all said arrangements, the mold or tool is kept stationary and the multiaxis positioner is moving the head system in space. Moving the head instead of the mold itself is desirable due to the fact that large part molds are very large in size and weight.

The only known exception to said arrangement is when large parts present a rounded shape. In such a case the part is moving, in particular it is rotated around a single center-line by means of an additional rotary motion, usually horizontal (e.g. the mold is placed between headstocks) or vertical (e.g. the mold is placed onto a rotary table). Said additional rotary motion is usually moving in concert with the positioner during the lay-up cycle or it is more simply used as an indexed motion with the purpose to bring a different portion of the mold inside the working envelope of the positioner.

Whether the large part is stationary or eventually spinning around a single center-line, once the lay-up cycle is completed, the replacement of the mold (now carrying a composite skin) inside the AFPM (Automatic Fiber Placement Machine) work zone, remains a delicate, time consuming and critical operation. The problem is aggravated if a different part mold is loaded inside said work-zone because it may require different clamping means for the proper anchoring of the mold to the ground. Moreover, moving the fiber placement head and its associated creel is not always the most efficient means of manufacture when smaller parts are taken into account. Yet further, attempting to move a large fiber placement head and its associated creel relative to a smaller part has proven to be quite difficult when the smaller part has complex geometry.

Efforts to manufacture small parts by using a floor-mounted stationary fiber placing head cooperating with a multi-articulated robot moving the part versus said head to perform the automatic layup are known. As an example, U.S. Pat. No. 8,758,538, the entire teachings and disclosure of which is incorporated herein by reference, teaches how a small part can be robotically moved against a plurality of stationary heads in order to obtain a multi-layer lay-up, with the possibility to receive different tows for each layer if necessary.

Although the system provides a workable solution for small composite parts manufacturing, it has major limitations. It has been discovered in fact that a substantial number of additional features are necessary in order to make possible a true automatic and flexible composite manufacturing system.

Most composite parts require multiple processes ranging from tape-laying to different tow size/composition. Additionally, some parts require a "sandwich" structure requiring an inter-laminar layup of foam, honeycomb layers or sealants that find the robot completely inadequate or unprepared to automatically apply such layers/materials whereas an operator could instead easily and efficiently perform such tasks.

Further, inter-process inspection is often a mandatory requirement and a second layer cannot even start without certifying that first layer quality meets the quality requirements and this can slow the robot significantly. In other words, the robot remains idle as the part is removed, inspected, and then placed on the robot again if it passes inspection.

Yet further, inter-process repair is often indispensable in order to proceed to the next step. Should the inspection of first layer discover discrepancies, a manual repair before proceeding to the next step is unavoidable, the option to scrap the part being economically unbearable. Given that it is quite common for such discrepancies to arise, the robot will again remain idle while repairs are completed.

Yet further, the automatic fiber placement heads as well as the creel, when mounted in a fixed orientation, are difficult to inspect and repair given their fixed orientation in space.

In other words, small composite parts cannot be manufactured in an efficient and reliable way unless the system provides a solution to the above identified requirements. Accordingly, there is a need in the art for an AFPM and associated methods that can readily manufacture smaller composite parts in an efficient and cost effective manner.

The invention provides such an apparatus and method. These and other advantages of the invention, as well as additional inventive features, will be apparent from the description of the invention provided herein.

BRIEF SUMMARY OF THE INVENTION

In one aspect, the invention provides a fully automated fiber placement system for small parts having a head system, wherein the head system includes a creel for carrying tow/tape magazines, and a fiber placement head attached thereto. The head system is mounted to a floor mounted pedestal providing to said system a C axis rotation around a centerline (axis). This rotation about the C-axis of the head system allows for maintaining a constant fiber tow path as the head does not move relative to the creel when rotating about the C-axis. The entire mold is moved in space versus the head by using a robotic arm. By small parts, it is meant parts that have a mold which have limited dimension and weight. As one non-limiting example, such parts may weigh about 1000 pounds to about 1500 pounds, and may encompass an area of about five to above six square meters. As better explained herein after, this provides a optimal tow path in terms of minimal distance and a straightness of the tows leaving each bobbin inside the creel toward the roller head. It also greatly improves the lay-up performances in areas where tows are requested to steer. Additionally it makes the system maintenance, inspection and refurbishment very easy and ergonomic.

In another aspect, the robot can easily and automatically load and unload different or identical molds. This not only allows the system a great flexibility but, more importantly, it is fundamental for successfully completing the composite manufacturing cycle as the same part, before completion, requires inspection, repair or some other manually applied sub tasks that cannot be performed by the robot hence they must be performed elsewhere. In other words, the part will have to be loaded and downloaded from the robot a number of times. It also means that the tool magazine must be able to move the parts between two different zones, zone A dedicated to robot automatic pick-up and zone B where the operator can safely perform any necessary task required, including an accurate inspection before sending it back to the robot.

As better explained here below, each mold will include a clamping means to allow a suitable robot having an end effector to pick the mold up and move it in any desired position and orientation versus the head compacting roller thus allowing any desired automated lay-up process wherein the head would provide all the tow/tape feed and the robot will provide the required relative motion between head compaction roller and mold surface replacing the effect of the positioned moving the head versus the mold. The Tool magazine will automatically bring each selected mould downloaded from zone A to zone B and vice-versa The invention also provides a solution for the automatic material handling wherein the robot can selectively pick up a plurality of different molds from the automated mold magazine located within the reach of the robot. This is advantageous where the particular loading of the fiber placement head creel is common to several different parts.

Additionally, the robot can bring any selected mold to more than one stationary head station, hence providing further flexibility as each different head would in such case be identical (to reduce downtime due to head refurbishing/maintenance) or different tow/tape to allow automatic layup of different tows/tape dimensions onto the same selected mold surface.

An embodiment according to the invention can be provided as an automatic fiber placement system for manufacturing components from composite materials comprising at least one automatic fiber placement head system having a fiber placement head and relative automatic tow magazine (creel) connected thereto. The head and creel are situated in proximity to at least one mold assembly dedicated to receive a multiple layer of tows from the head wherein said head and tow magazine are rotated together around a C-axis motion provided by a floor-mounted pedestal, and the mold assembly is moved in space by means of a multi-articulated robot that provides the necessary relative motion between the stationary head and the mold.

The multi-articulated robot is configured such that it can connect and carry each mold assembly in space according to a multi-pass path strategy dictated by suitable control means that are providing commands for the head and for the robot motion in concert. While numerous types of mold assemblies are contemplated as being utilized by such a system, one example of an mold assembly includes an active contoured surface for the lay-up, suitable support frame and mechanical means to allow the robot to connect and carry said mold assembly.

The head system is mounted to a floor-mounted pedestal that provides for rotation about a C axis oriented in any suitable direction or angle versus the floor. Additionally, said pedestal may feature additional motion (in addition to C axis rotation), for example a linear motion of the head system toward a working envelope of the robot to minimize robot motion requirements. This feature is very useful to actively stretch the robot work zone when parts require motion exceeding the robot standard capabilities.

Further, the system may be provided with a mold magazine configured for holding a plurality of different mold assemblies, and the robot may be configured to selectively retrieve each of the different mold assemblies from the mold magazine and bring it into proximity with the fiber placement head. The magazine may be automated, such that it can index the mold assemblies from one area to another. For example, the mold magazine may index a mold assembly to a first zone, where it is accessible by the robot. Once a fiber placement operation is completed on that mold assembly, the same may be placed back in the magazine by the robot. The magazine can then index the mold assembly to a second zone, where it is accessible by an operator for secondary operations, e.g. repairs, inspections, etc.

Further, a plurality of different or identical head stations, a part one from another and all within the reach of the robot, may be utilized in a single system. The robot can pick-up any desired mold assembly from the mold magazine and bring it to any desired head each one having any desired centerline orientation thus allowing the possibility to build-up the composite structure onto one selected mold with tows provided by different heads. The different heads may provide identical tows, or may each provide tows having differing characteristics than those provided by the other heads. The heads may be tow laying heads, or tape laying heads, and as stated above, tows is used herein to collectively refer to both.

According to an alternative aspect of the present invention, a secondary robot, far smaller and less accurate that the main one cooperating with the fiber placement heads, can be integrated inside the flexible manufacturing system to automatically carry-out inspection cycles in hidden time, providing to the operators an aid in contracting the cycle time.

According to another aspect of the present invention, the mold including its clamping interface is suitable to be inserted in an autoclave and consequently withstand the related thermal stress.

In a particular embodiment, the invention provides a fiber placement system that includes a head system including a creel and a fiber placement head fixedly mounted to the creel, as well as a pedestal for carrying the head system. The system also includes a robot in spaced relationship to the head system. The system also includes a magazine for carrying a mold assembly. The magazine is movable to index the mold assembly to a first location wherein the mold assembly is retrievable by the robot, and a second location outside of a working envelope of the robot.

The magazine may be configured to carry a plurality of mold assemblies. The magazine may also includes clamping elements for fixedly retaining a portion of a frame of a respective one of the plurality of mold assemblies.

An identification arrangement may be formed between the magazine and each one of the plurality of mold assemblies to allow for the identification of each one of the plurality of mold assemblies and its specific position on the magazine. The identification arrangement includes an identification element situated on each mold assembly, and a detection element in proximity to each one of a plurality of mounting locations of the magazine. The identification element is one of a bar code situated on a frame of the mold assembly or an RFID tag situated on the frame of the mold assembly. The detection element is one of an optical scanner or an RFID detector.

The head system may be rotatably mounted to the pedestal such that the head system is rotatable about is center longitudinal axis. The head system may also be linearly movable relative to the pedestal in a direction parallel to the center longitudinal axis.

Each one of the plurality of mold assemblies may include a frame member with an interface, wherein the interface is identical across each one of the plurality of mold assemblies such that a single end effector of the robot is operable to grasp each one of the plurality of mold assemblies.

The system may also include a plurality of robots in spaced relation to the head system, or a plurality of head systems in spaced relation to the robot, or a plurality of head systems and a plurality of robots in spaced relation to one another.

In another particular embodiment, a fiber placement system is provided that includes a head system including a creel and a fiber placement head fixedly mounted to the creel, as well as a pedestal for carrying the head system, the head system rotationally mounted to the pedestal. The system also includes a robot in spaced relationship to the head system. The system also includes a magazine for carrying a mold assembly the magazine situated in proximity to the robot such that the robot may retrieve the mold assembly from the magazine, and place the mold assembly on the magazine.

The head system may be rotationally mounted to the pedestal such that it is rotatable about is longitudinal center line to govern an orientation of the fiber placement head and creel. A drive unit for selectively rotating the head system about its longitudinal center line may also be provided. The pedestal elevates the head system off of ground such that the creel and head unit do not contact ground.

In another particular embodiment, a method for fiber placement is provided that includes providing at least one head system including a creel and a fiber placement head mounted to the creel, providing at least one robot in proximity to the at least one head system, and providing a magazine in proximity to the at least one robot, the magazine carrying a mold assembly. The method also includes indexing the mold assembly to a first location accessible by the robot and retrieving the mold assembly from the magazine at the first location using the robot. The method also includes conducting at least one fiber placement operation by bringing the mold assembly into contact with the fiber placement head, and placing the mold assembly back on the magazine upon completion of the at least one fiber placement operation.

The method may also include indexing the mold assembly after completion of the at least one fiber placement operation to a second location outside of a working envelope of the at least one robot. The method may also include retrieving another mold assembly from the magazine after indexing the mold assembly to the second location.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
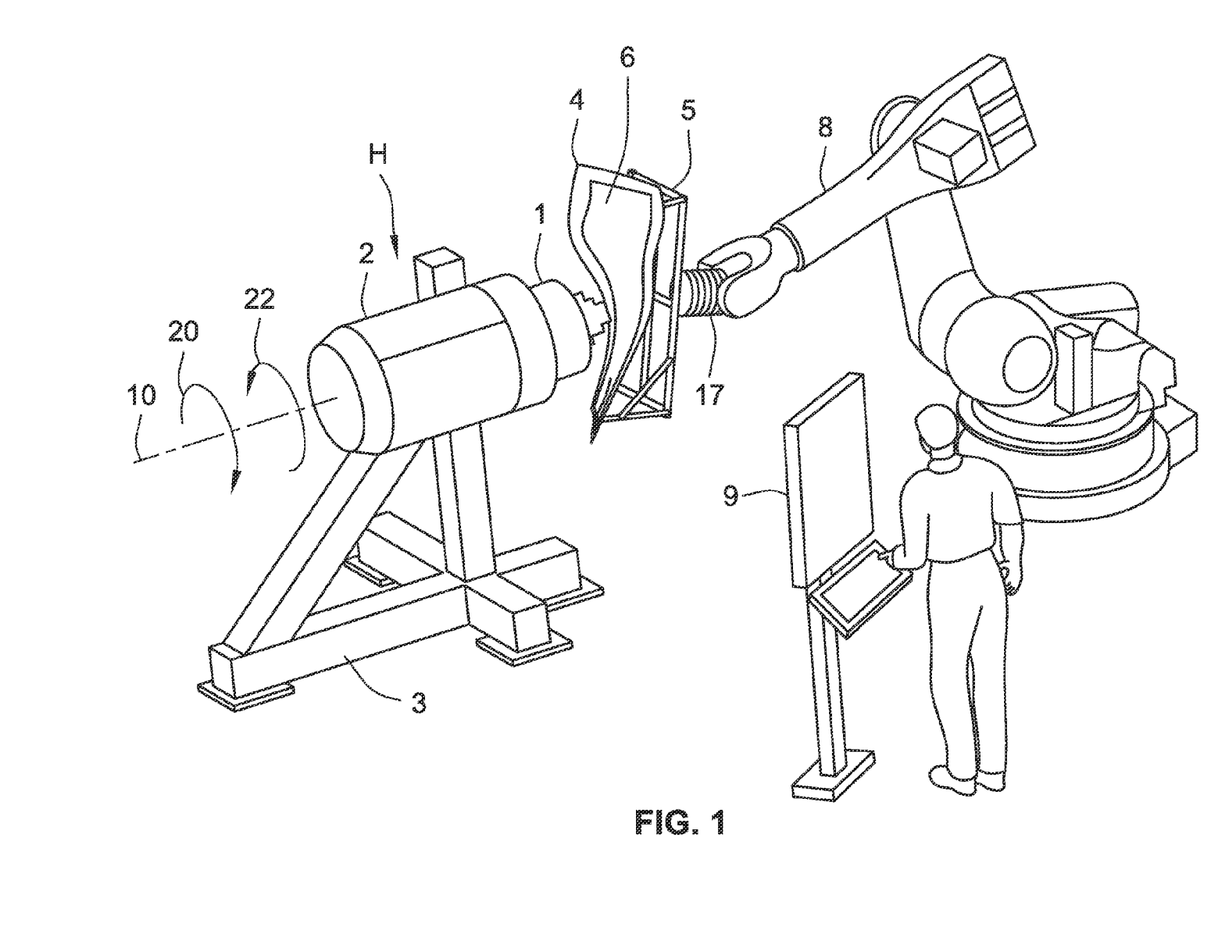
FIG. 1 is a generally schematic representation of one embodiment of a fiber placement system according to the teachings of the present invention.

FIG. 1 schematically shows one embodiment of a fiber placement system according to one preferred embodiment of the invention. The system includes a head system H that comprises an automatic fiber placement head 1 equipped with a compaction roller and all the necessary features, typically used in automated fiber placement system such as tow inspection, selective cut and add features for each individual tow, a substrate heater and others.

The head system H also includes a creel 2 upon which the head 1 is fixedly attached. As is known, the creel is an automated magazine for the bobbins containing the tows, usually comprising means to provide constant tension of each individual tow under any speed rate and a plastic film tape rewinding system which collects the plastic tape from the tow while being extracted.

The head 1 and the creel 2 connected thereto are held by a pedestal 3. As explained in greater detail below, the head system H is rotationally mounted to the pedestal such that it can rotate about its center line 10, or C-axis. It should be noted that in FIG. 1, the head center line 10 or C axis is held in a substantially horizontal plane parallel to the ground but, as better later explained below, the center line 10 can be vertical or in any other position deemed optimal for fiber placement operations.

The fiber placement system also utilizes a robot 8 to move a mold assembly 4 relative to and against an end of the fiber placement head to effectuate fiber placement. The robot 8 has the ability to move the part according to all the degrees of freedom necessary to bring and orient the mold surface 6 of the mold assembly to the center-line 10 of the head 1 in any point of the mold thus allowing for the desired lay-up path according to a dedicated lay-up program executed by a cell controller 9 which coordinates all the functions of the head 1 and related creel 2 as well as all the necessary motion of robot 8 and magazine 30 (discussed below) to carry out a fully automated lay-up cycle.

Figure 2:
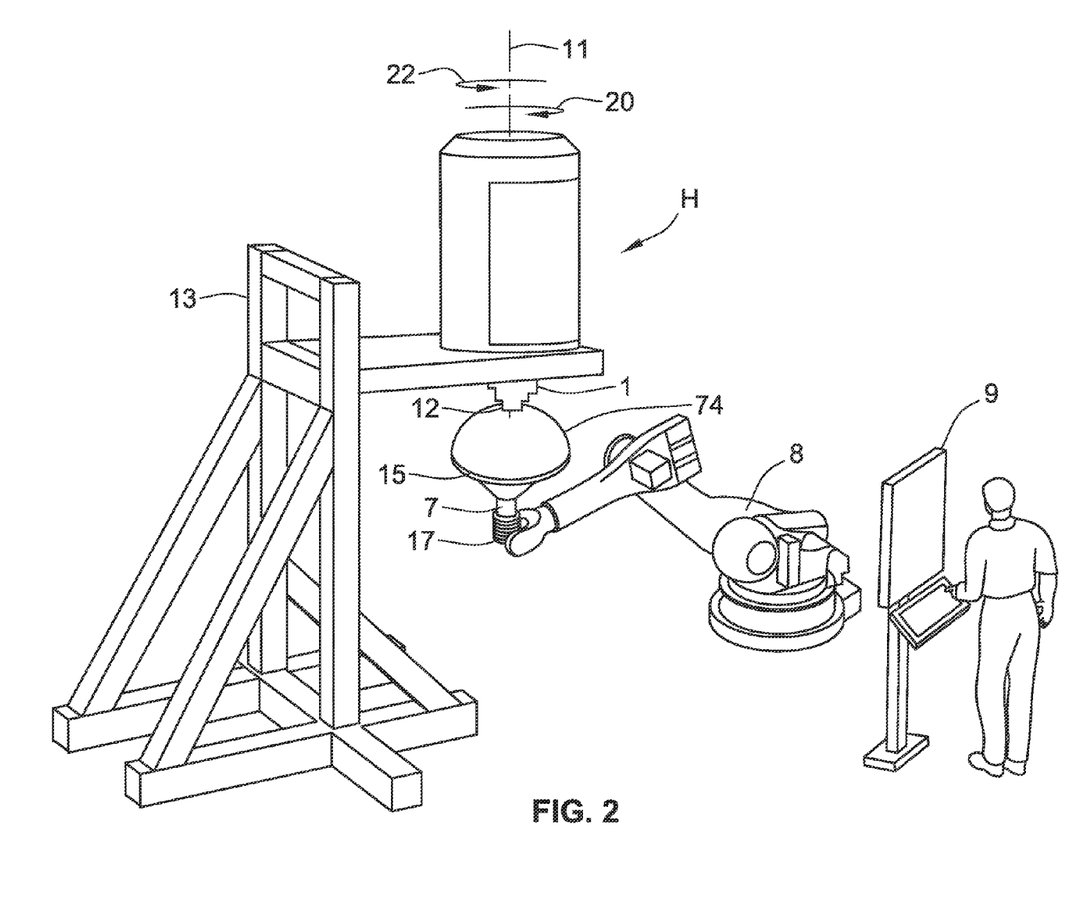
FIG. 2 is a generally schematic representation of another embodiment of a fiber placement system according to the teachings of the present invention.

FIG. 2 shows an alternative arrangement of the system of FIG. 1 wherein the head system H has a centerline 11 oriented vertically by means of a pedestal 13 although, as briefly mentioned above, the center line of the head 1 can alternatively be oriented in any direction versus the floor to optimize the robotic motion of the moving mold. The head system H in this alternative configuration is also rotationally mounted to the pedestal 13 to allow for rotation of the head system H about the centerline 11.

FIG. 2 also shows the compaction roller 12 of head 1 and a different mold assembly 15, intentionally with a different shape of mold assembly 4 of FIG. 1, to underline that an important feature of the system is the ability of robot 8 to selectively pick up a plurality of different "small" mold assemblies thus offering a greater system flexibility. Likewise to that shown in FIG. 1, the system of FIG. 2 includes the robot automatic mold clamping interface 17 and the cell controller 9.

Figure 5:
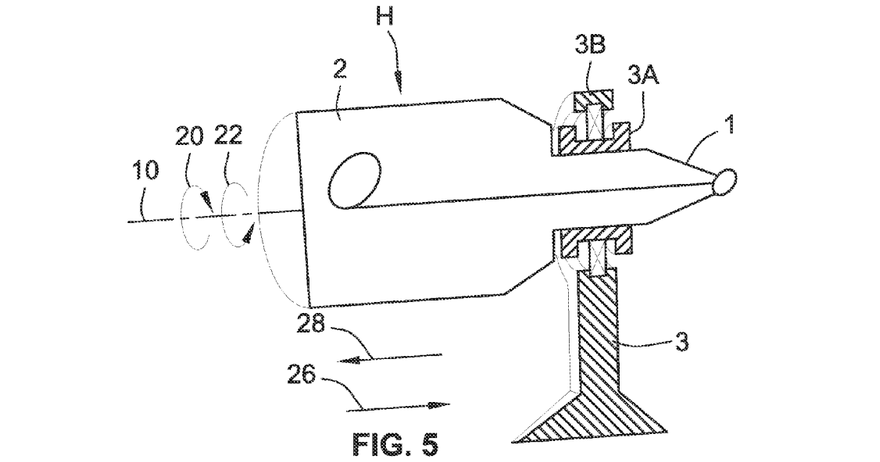
FIG. 5 is a generally schematic illustration of a head system of the fiber placement system.

With momentary reference to FIG. 5, the same illustrates the rotational mounting configuration of the head system H. Pedestal 3 includes a rotational bearing 3B. A hollow drive collar 3A is affixed to the head system H as shown. A drive unit 3C, e.g. a torque motor and associated gear train, is responsible for applying a drive torque to the drive collar 3A to effectuate a rotation about the centerline 10 in either of rotational directions 20 or 22. Head 1 and creel 2 are connected to drive collar 3A, and as a result, the two components rotate simultaneously and there is no relative rotation between the same. As such, there is no change in the tow path or twisting thereof. The ability to manipulate the orientation of the head system H about its center line 10 allows for achieving an optimal orientation of the head 1 relative to the mold assembly 4. This improves lay-up conditions in tight compound surfaces. It should also be noted that this same mounting configuration may be utilized for other center line orientations, such as the orientation shown in FIG. 2 as well.

According to one alternative embodiment of the present invention, the pedestal 3 can offer rotating means to allow for changing the orientation of head 1 centerline 10 for example from horizontal to vertical or different angles to facilitate robot 8 movements according to the selected shape of the loaded mold assembly. Additionally, pedestal 3 may also allow for a linear translation of head system H along the C-axis in directions 26 and 28 as illustrated, using for example, linear bearings or the like. Such a configuration allows for accommodating parts which require motions exceeding those capable of the robot 8 alone.

Figure 3A:
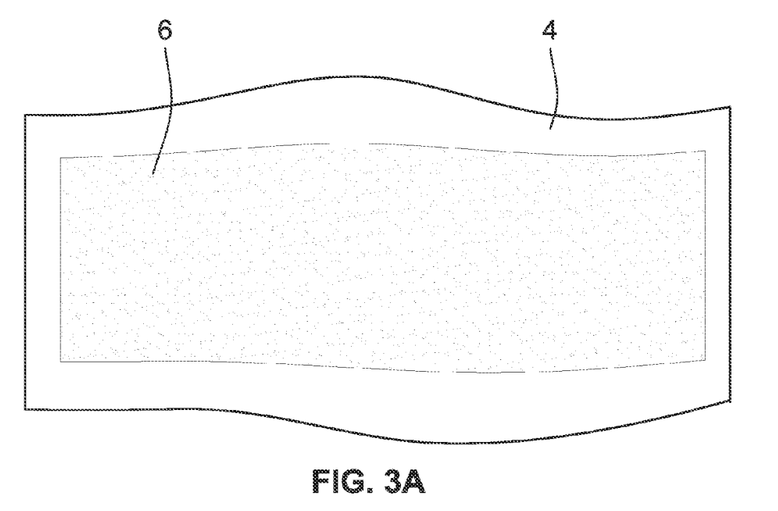
FIGS. 3A-3C are generally schematic representations of one embodiment of a mold assembly that may be employed with the system herein.
Figure 3B:
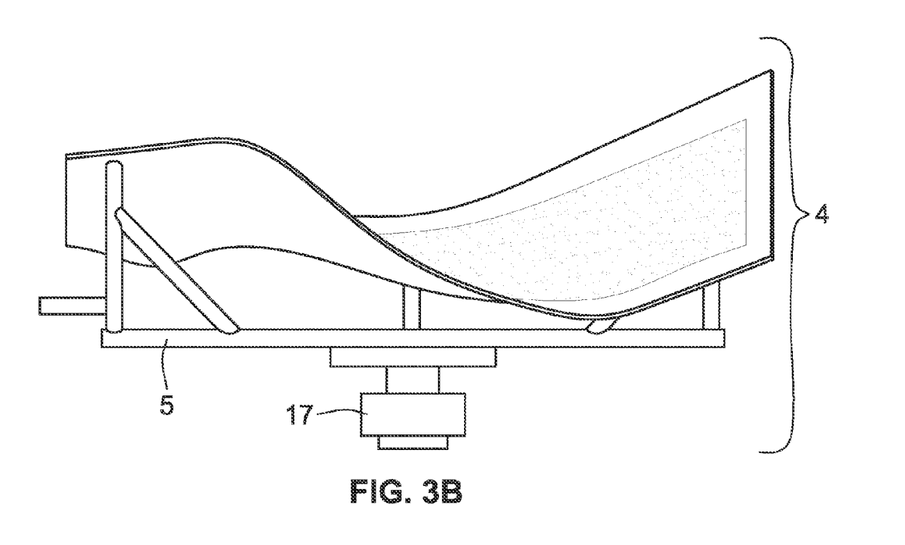
Figure 3C:
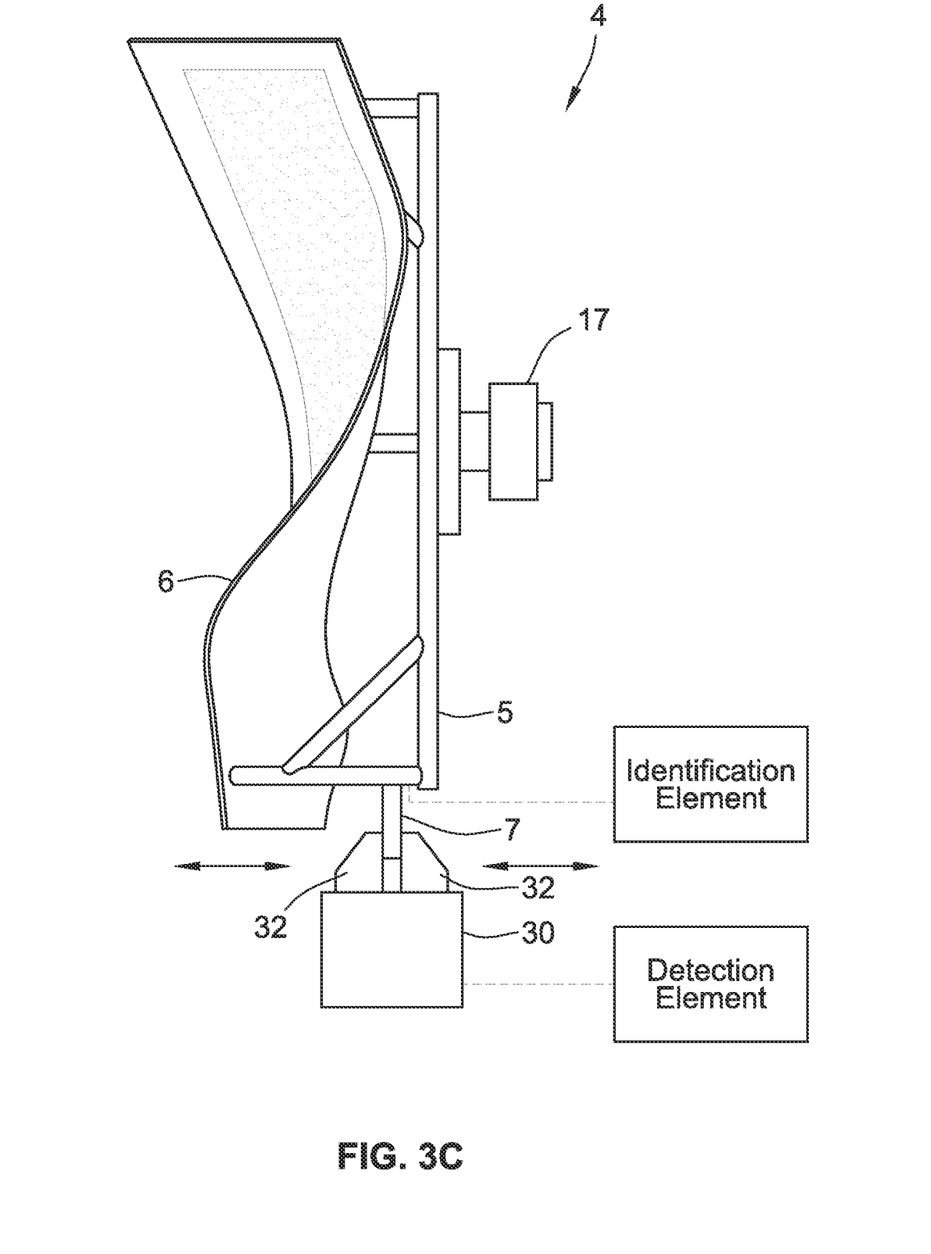

Referring now to FIGS. 3A-3C, the same show several views of one embodiment of a mold assembly 4, particularly the mold assembly also shown in FIG. 1. As can be seen in FIGS. 3A and 3B, mold assembly 4 comprises a structural frame 5, a contoured mold surface 6 dedicated to receive the composite skin generated by the interaction with the head 1, and an interface 17 dedicated to offer an automatic means for the robot 8 to grasp the mold assembly. Specifically, the interface 17 is common across multiple structural frames 5 to allow for a single end effector on the robot 8 to be employed.

With specific reference to FIG. 3C, the frame 5 also offers a locating arrangement for precisely depositing and locating the mold assembly 4 onto a mold assembly magazine 30 discussed in greater detail below. One example of such a locating arrangement is one or more projections 7 which extend from the frame 5 as shown. The magazine 30 for holding each mold assembly 4 includes clamping elements 32 for clamping mold assembly 4 to magazine 30. The clamping elements are movable as shown to release the mold assembly 4 from magazine 30 as the robot 8 attaches to interface 17.

Further, an identification arrangement is formed between the magazine 30 and each mold assembly 4 carried thereby. The identification arrangement includes an identification element formed mold assembly 4, and a detection element located on the magazine 30. As one example, the identification element may by an engraved bar code or the like and the detection element may be an optical camera or other scanner capable of reading the bar code. The identification element could also be an RFID tag, and the detection element could be an associated RFID detector. These are only several examples of many. This identification arrangement allows for the positional tracking of each mold assembly 4 as it is carried by the magazine 30, and also allows for the determination of whether or not a particular mold assembly 4 is situated in magazine 30. This information may be communicated to cell controller 9 (see FIG. 1) for process control.

Figure 4:
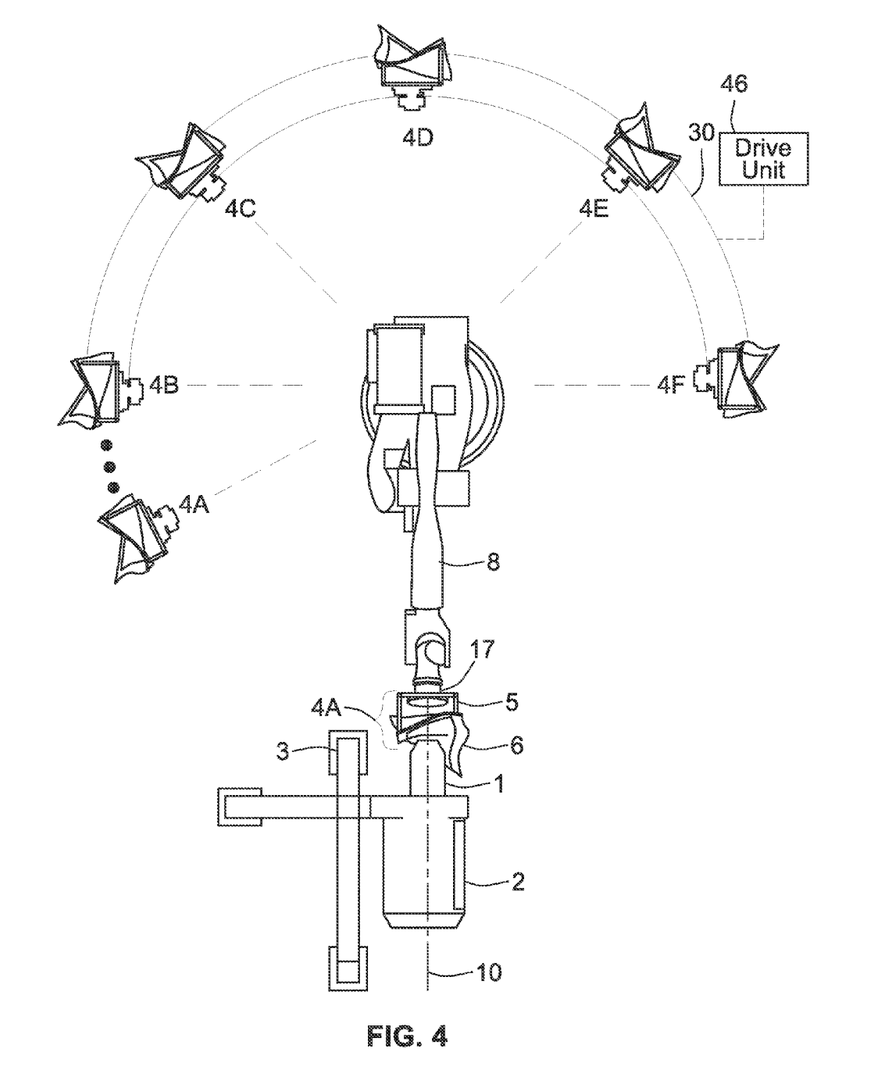
FIG. 4 is a generally schematic representation of another embodiment of a fiber placement system according to the teachings of the present invention.

FIG. 4 schematically shows a top view of FIG. 1 and shows how robot 8 can actively pick up any desired mold assembly 4A-4F from a family of identical or different units strategically located within the robot working zone and carried by magazine 30. The particular shape of magazine 30 is for exemplary purposes only, as will be understood from the following. It should be noted that while a single robot 8 and head system H are illustrated, multiple robots 8 and head systems H may be employed as explained in the following.

Figure 6:
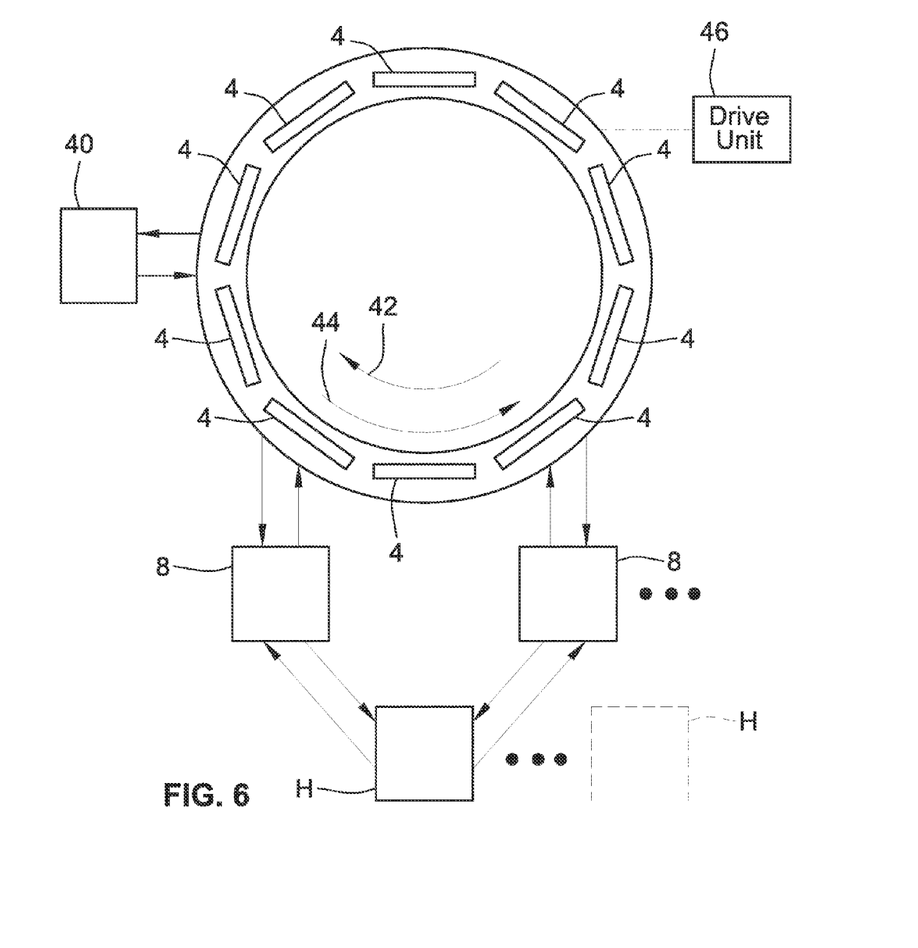
FIG. 6 is an exemplary embodiment of schematic layout of a work cell employing the teachings of the present invention.

Turning now to FIG. 6, in a particularly advantageous embodiment, the magazine 30 is operable to index a plurality of mold assemblies in directions 42, 44 as shown. Indeed, the magazine 30 includes a drive unit 46, e.g. an electrical motor and associated mechanical linkages, for rotating the generally circular shaped magazine 30 in directions 42, 44. In one exemplary embodiment, magazine 30 is a carrousel arrangement, i.e a rotatable table with a plurality of designated locations, each for carrying a mold assembly 4.

At each designated location, clamping elements 32 and a detection element such as those described above at FIG. 3C may also be provided. Also shown in this view is the use of multiple robots 8, and multiple head systems H. The robots 8 are situated in proximity to the magazine 30 as well as the head systems H such that they can take a mold assembly 4 indexed to a retrieval position from the magazine 30, and then conduct fiber placement operations relative to the head systems H and the reverse once fiber placement operations are completed. A single robot 8 may be capable of operating with multiple head systems H as well, and/or multiple robots 8 may be capable of operating with any one single head system H.

As another advantage, the above referenced indexing capabilities allows for interim operations such as inspection and repair to be rapidly conducted without slowing down total process time. For example, a mold assembly 4 may be retrieved by a robot 8. The robot 8 may then bring the mold assembly into contact with one or more head systems H to conduct fiber placement operations. In the event that an interim operation is required, e.g. a manual operation such as inspection, trimming, rework, or an automated operation, the robot 8 can transfer the mold assembly back to the magazine 30. Thereafter, the magazine 30 is operable to index the mold assembly 30 to a manual operation station 48 (e.g. an inspection station) separate from the working area of the robots 8. A worker may retrieve the mold assembly 4 of which inspection is required, or alternatively inspect the mold assembly in the magazine 30 in proximity to the inspection station 48. In an alternative configuration, the robot 8 may transfer the mold assembly 4 to an inspection station 48 directly.

Each robot may be arranged such that it may reach each head system H, or select ones of the head systems H. Furthermore, instead of the robot 8 heretofore introduced, of the of the robots 8 may be a smaller inspection-type robot which may be situated in proximity to magazine 30 to conduct automatic inspection operations of mold assemblies while situated on magazine 30.

Simultaneously, the robot 8 may grab the next mold assembly 4 after the above referenced indexing is completed and conduct the same fiber placement operations as those done on the prior mold assembly. This is a significant advantage over prior designs which require machine shutdown and lengthy removal steps for removing the mold assembly for inspection.

It will also be recognized that, by using multiple head systems H, a plurality of differing types of materials and/or operations may be conducted. For example, the head systems H may employ thermoset/thermoplastic carbon fiber or fiber glass, tape layers including but not limited tape layers for carbon tapes or copper mesh, additive extruded materials.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fiber placement system comprising:
   a head system including a creel and a fiber placement head fixedly mounted to the creel;
   a pedestal for carrying the head system;
   a robot in spaced relationship to the head system; and
   a magazine for carrying a mold assembly, the magazine movable to index the mold assembly to a first location wherein the mold assembly is retrievable by the robot, and a second location outside of a working envelope of the robot.

2. The fiber placement system of claim 1, wherein the magazine is configured to carry a plurality of mold assemblies.

3. The fiber placement system of claim 2, wherein the magazine includes clamping elements for fixedly retaining a portion of a frame of a respective one of the plurality of mold assemblies.

4. The fiber placement system of claim 2, further comprising an identification arrangement formed between the magazine and each one of the plurality of mold assemblies to allow for the identification of each one of the plurality of mold assemblies and its specific position on the magazine.

5. The fiber placement system of claim 4, wherein the identification arrangement includes an identification element situated on each mold assembly, and a detection element in proximity to each one of a plurality of mounting locations of the magazine.

6. The fiber placement system of claim 5, wherein the identification element is one of a bar code situated on a frame of the mold assembly or an RFID tag situated on the frame of the mold assembly.

7. The fiber placement system of claim 6, wherein the detection element is one of an optical scanner or an RFID detector.

8. The fiber placement system of claim 1, wherein the head system is rotatably mounted to the pedestal such that the head system is rotatable about is center longitudinal axis.

9. The fiber placement system of claim 8, wherein the head system is linearly movable relative to the pedestal in a direction parallel to the center longitudinal axis.

10. The fiber placement system of claim 2, wherein each one of the plurality of mold assemblies includes a frame member with an interface, wherein the interface is identical across each one of the plurality of mold assemblies such that a single end effector of the robot is operable to grasp each one of the plurality of mold assemblies.

11. The fiber placement system of claim 1, further comprising a plurality of robots in spaced relation to the head system.

12. The fiber placement system of claim 1, further comprising a plurality of head systems in spaced relation to the robot.

13. The fiber placement system of claim 1, further comprising a plurality of head systems and a plurality of robots in spaced relation to one another.

14. A fiber placement system, comprising:
a head system including a creel and a fiber placement head fixedly mounted to the creel;
a pedestal for carrying the head system, the head system rotationally mounted to the pedestal;
a robot in spaced relationship to the head system; and
a magazine for carrying a mold assembly the magazine situated in proximity to the robot such that the robot may retrieve the mold assembly from the magazine, and place the mold assembly on the magazine.

15. The fiber placement system of claim 14, wherein the head system is rotationally mounted to the pedestal such that it is rotatable about is longitudinal center line to govern an orientation of the fiber placement head and creel.

16. The fiber placement system of claim 15, further comprising a drive unit for selectively rotating the head system about its longitudinal center line.

17. The fiber placement system of claim 16, wherein the pedestal elevates the head system off of ground such that the creel and head unit do not contact ground.

18. A method for fiber placement, comprising:
providing at least one head system including a creel and a fiber placement head mounted to the creel;
providing at least one robot in proximity to the at least one head system;
providing a magazine in proximity to the at least one robot, the magazine carrying a mold assembly;
indexing the mold assembly to a first location accessible by the robot;
retrieving the mold assembly from the magazine at the first location using the robot;
conducting at least one fiber placement operation by bringing the mold assembly into contact with the fiber placement head; and
placing the mold assembly back on the magazine upon completion of the at least one fiber placement operation.

19. The method of claim 18, further comprising indexing the mold assembly after completion of the at least one fiber placement operation to a second location outside of a working envelope of the at least one robot.

20. The method of claim 19, further comprising retrieving another mold assembly from the magazine after indexing the mold assembly to the second location.

\* \* \* \* \*